US011282259B2

(12) United States Patent
Baughman et al.

(10) Patent No.: US 11,282,259 B2
(45) Date of Patent: Mar. 22, 2022

(54) NON-VISUAL ENVIRONMENT MAPPING

(71) Applicant: International Business Machines Corporation, Armonk, NY (US)

(72) Inventors: Aaron K. Baughman, Silver Spring, MD (US); Gary F. Diamanti, Wake Forest, NC (US); Mauro Marzorati, Lutz, FL (US); Moncef Benboubakeur, Brno (CZ)

(73) Assignee: International Business Machines Corporation, Armonk, NY (US)

( * ) Notice: Subject to any disclaimer, the term of this patent is extended or adjusted under 35 U.S.C. 154(b) by 94 days.

(21) Appl. No.: 16/199,746

(22) Filed: Nov. 26, 2018

(65) Prior Publication Data

US 2020/0167988 A1  May 28, 2020

(51) Int. Cl.
*G06T 15/04* (2011.01)
*H04N 13/279* (2018.01)
*G01C 11/02* (2006.01)

(52) U.S. Cl.
CPC .............. *G06T 15/04* (2013.01); *G01C 11/02* (2013.01); *H04N 13/279* (2018.05); *G06T 2207/20212* (2013.01)

(58) Field of Classification Search
None
See application file for complete search history.

(56) References Cited

U.S. PATENT DOCUMENTS

| 6,115,482 | A   |   | 9/2000  | Sears et al.    |            |
|-----------|-----|---|---------|-----------------|------------|
| 8,150,107 | B2  |   | 4/2012  | Kurzweil et al. |            |
| 8,645,140 | B2  |   | 2/2014  | Lobzakov        |            |
| 8,873,890 | B2  |   | 10/2014 | Kurzweil et al. |            |
| 9,236,043 | B2  |   | 1/2016  | Kurzweil et al. |            |
| 9,355,547 | B2  |   | 5/2016  | Stevens et al.  |            |
| 9,541,407 | B1  | * | 1/2017  | Mohler          | H04W 4/90  |
| 10,823,562| B1  | * | 11/2020 | Carnahan        | G01C 21/3804 |
| 11,138,747| B1  | * | 10/2021 | Seiler          | G06T 11/40 |

(Continued)

FOREIGN PATENT DOCUMENTS

GB 2 405 018 A 2/2005
WO 2013173898 A2 11/2013

OTHER PUBLICATIONS

Kostopoulos, Konstantinos, et al. "Haptic access to conventional 2D maps for the visually impaired." Journal on Multimodal User Interfaces 1.2 (2007): 13-19. (Year: 2007).*

(Continued)

*Primary Examiner* — Michelle M Entezari
(74) *Attorney, Agent, or Firm* — Christopher Pignato; Hunter E. Webb; Keohane & D'Alessandro, PLLC

(57) ABSTRACT

Aspects of the present invention provide an approach for non-visually mapping an environment. In an embodiment, a set of images that is within the field of view of the user is captured from a video capture device worn by the user. Environmental text that is within the set of images is identified. An aural contextual indicator that corresponds to the environmental text is then generated. This aural contextual indicator indicates the informational nature of the environmental text. An aural map of the environment is created using a sequence of the generated aural contextual indicators. This aural map is delivered to the user via an aural output device worn by the user in response to a user request.

20 Claims, 8 Drawing Sheets

(56) References Cited

U.S. PATENT DOCUMENTS

| | | | |
|---|---|---|---|
| 2001/0056342 A1 | 12/2001 | Piehn et al. | |
| 2004/0218910 A1 | 11/2004 | Chang et al. | |
| 2006/0017810 A1 | 1/2006 | Kurzweil et al. | |
| 2008/0246654 A1* | 10/2008 | Cheng | G01C 21/20 342/357.64 |
| 2009/0161991 A1 | 6/2009 | Nestares | |
| 2011/0137437 A1* | 6/2011 | Jonsson | G10L 15/26 700/94 |
| 2011/0307172 A1* | 12/2011 | Jadhav | G01S 19/14 701/491 |
| 2013/0262449 A1 | 10/2013 | Arroyo et al. | |
| 2013/0289971 A1 | 10/2013 | Parkinson et al. | |
| 2013/0293577 A1 | 11/2013 | Perez et al. | |
| 2014/0085446 A1 | 3/2014 | Hicks | |
| 2014/0270482 A1 | 9/2014 | Chakraborty et al. | |
| 2015/0002808 A1 | 1/2015 | Rizzo, III et al. | |
| 2015/0120276 A1 | 4/2015 | Wu | |
| 2015/0169972 A1 | 6/2015 | Vu et al. | |
| 2015/0220157 A1 | 8/2015 | Marggraff et al. | |
| 2015/0339536 A1 | 11/2015 | Lin et al. | |
| 2016/0004911 A1 | 1/2016 | Cheng et al. | |
| 2016/0028945 A1 | 1/2016 | Kraft et al. | |
| 2016/0063893 A1* | 3/2016 | Kanuganti | G09B 21/003 348/62 |
| 2016/0171329 A1 | 6/2016 | Khintsitskiy et al. | |
| 2016/0259996 A1* | 9/2016 | Hartley | G06K 9/00671 |
| 2016/0314708 A1 | 10/2016 | Cohain et al. | |
| 2017/0206887 A1 | 7/2017 | Wilbert et al. | |
| 2019/0303096 A1 | 10/2019 | Baughman et al. | |
| 2020/0143585 A1* | 5/2020 | Seiler | G06T 19/006 |

OTHER PUBLICATIONS

Tachiquin, Ricardo, et al. "Wearable Urban Mobility Assistive Device for Visually Impaired Pedestrians Using a Smartphone and a Tactile-Foot Interface." Sensors 21.16 (2021): 5274. (Year: 2021).*

Chaccour, Kabalan, and Georges Badr. "Novel indoor navigation system for visually impaired and blind people." 2015 International Conference on Applied Research in Computer Science and Engineering (ICAR). IEEE, 2015. (Year: 2015).*

Strumillo, Pawel. "Electronic interfaces aiding the visually impaired in environmental access, mobility and navigation." 3rd International Conference on Human System Interaction. IEEE, 2010. (Year: 2010).*

Chaccour, Kabalan, and Georges Badr. "Computer vision guidance system for indoor navigation of visually impaired people." 2016 IEEE 8th International Conference on Intelligent Systems (IS). IEEE, 2016. (Year: 2016).*

Helal, Abdelsalam, Steven Edwin Moore, and Balaji Ramachandran. "Drishti: An integrated navigation system for visually impaired and disabled." Proceedings fifth international symposium on wearable computers. IEEE, 2001. (Year: 2001).*

Katz, Brian FG, et al. "NAVIG: augmented reality guidance system for the visually impaired." Virtual Reality 16.4 (2012): 253-269. (Year: 2012).*

Khan, Akif, and Shah Khusro. "An insight into smartphone-based assistive solutions for visually impaired and blind people: issues, challenges and opportunities." Universal Access in the Information Society 20.2 (2021): 265-298. (Year: 2021).*

Lu, Qian. "Feasibility Study of a"Smart" Aid for the Visually Impaired and Blind's Independent Mobility in Outdoor Environments." (2018). (Year: 2018).*

Sturmer, Jake, "Why so many Japanese train stations play different jingles", ABC News, Feb. 2, 2018, 5 pgs.

Lee, Hosub et al., "Personalized Object Recognition for Augmenting Human Memory", 2016 ACM, 8 pgs.

"Bringing sight to blind and low vision people", www.bemyeyes.com, Jul. 16, 2018, 3 pgs.

Sagar G.K. et al., "Real Time Implementation of Optical Character Recognition Based TTS System using Raspberry pi". International Journals of Advanced Research in Computer Science and Software Engineering, ISSN: 2277-128X, vol. 7, Issue 7, Jul. 2017, pp. 149-156.

Anusha A. Pingale et al., "Product Reading for Visually Impaired Persons", International Research Journal of Engineering and Technology (IRJEI), vol. 2, Issue 4, Jul. 2015, pp. 1688-1690.

PCOM000189444D, "Accessible multidimensional text displays", Publication Date: Nov. 9, 2009, 5 pages.

PCOM000250456D, "A framework for Sign Language to Speech and Speech to Sign Language translation, based on Recommended System Techniques", Publication Date: Jul. 19, 2017, 10 pages.

Siemens Juergen Cartens, IPCOM00020202376D, "A Text-to-speech System for Hearing Aids", Publication Date: Dec. 14, 2010, 2 pages.

PCOM000239749D, "A Method and System for Annotating and Editing an Image before Capturing the Image", Publication Date: Dec. 1, 2014, 4 pages.

PCOM000177547D, "Environmental and Hazard Detection Using a Portable Apparatus", Publication Date: Dec. 17, 2008, 3 pages.

Appendix P, "List of IBM Patents or Patent Applications Treated as Related", 2 pages.

Patel, Shreyans A., U.S. Appl. No. 15/943,899, Notice of Allowance dated Apr. 15, 2020, P201702929US01, 8 pgs.

Shreyans A. Patel, USPTO Office Action, U.S. Appl. No. 15/943,899, Notification dated Nov. 22, 2019, 18 pages.

* cited by examiner

NON-VISUAL ENVIRONMENT MAPPING

TECHNICAL FIELD

The subject matter of this invention relates generally to environment mapping. More specifically, aspects of the present invention provide a solution that maps an environment by storing visual (e.g., textual, symbolic, etc.) information that may be present within a particular environment aurally (e.g., vocalized).

BACKGROUND

In the modern environment of today, a large amount of information is delivered through written communications. These written communications can include street signs, location indicators, alerts, billboard advertisements, scrolling information tickers, and/or the like. Generally, this type of environmental visual information allows for efficient delivery of information to a large number of people in an area. However, this delivery solution breaks down if the intended recipient is unable to read the visual information located in the environment. For example, the intended recipient may be visually impaired. Alternatively, the intended recipient may be illiterate, may not understand the language, etc.

For example, with respect to people who are visually impaired, there currently exist mechanisms for them to be able to read at close range (e.g., Braille); however, these only deliver information to the person when the person is in direct contact. As such, visually impaired people frequently live without the knowledge of what is around them. They may recognize things when they hear or touch them, but they are currently unable to recognize environmental visual information—on the streets, malls, restaurants, beach, parks, etc., that are based on text signs or signs with particular symbols on them to deliver descriptions or alerts—unless someone else reads it to them.

A 2016 paper by Leet et al. entitled Personalized Object Recognition for Augmenting Human Memory has an Abstract section that states as follows: "We propose a novel wearable system that enables users to create their own object recognition system with minimal effort and utilize it to augment their memory. A client running on Google Glass collects images of objects a user is interested in, and sends them to the server with a request for a machine learning task: training or classification. The server processes the request and returns the result to Google Glass. During training, the server not only aims to build machine learning models with user generated image data, but also to update the models whenever new data is added by the user. Preliminary experimental results show that our system DeepEye is able to train the custom machine learning models in an efficient manner and to classify an image into one of 10 different user-defined categories with 97% accuracy. We also describe challenges and opportunities for the proposed system as an external memory extension aid for end users."

SUMMARY

In general, aspects of the present invention provide an approach for non-visually mapping an environment. In an embodiment, a set of images that is within the field of view of the user is captured from a video capture device worn by the user. Environmental text that is within the set of images is identified. An aural contextual indicator that corresponds to the environmental text is then generated. This aural contextual indicator indicates the informational nature of the environmental text. An aural map of the environment is created using a sequence of the generated aural contextual indicators. This aural map is delivered to the user via an aural output device worn by the user in response to a user request.

One aspect of the invention provides a method for non-visually mapping an environment, comprising: capturing, from a video capture device worn by a user, a set of images that is within a field of view of the user; identifying environmental text within the set of images; generating an aural contextual indicator corresponding to the environmental text, the aural contextual indicator indicating an informational nature of the environmental text; creating an aural map of the environment using a sequence of generated aural contextual indicators; and delivering the aural map of the environment to the user via an aural output device worn by the user in response to a user request.

Another aspect of the invention provides a system for non-visually mapping an environment, comprising: a video capture device worn by a user; an aural output device worn by the user; and at least one computer device in communication with the video capture device and the aural output device that causes the system to perform a method, comprising: capturing, from the video capture device, a set of images that is within a field of view of the user; identifying environmental text within the set of images; generating an aural contextual indicator corresponding to the environmental text, the aural contextual indicator indicating an informational nature of the environmental text; creating an aural map of the environment using a sequence of generated aural contextual indicators; and delivering the aural map of the environment to the user via an aural output device worn by the user in response to a user request.

Yet another aspect of the invention provides a computer program product embodied in a computer readable medium that, when executed by a computer device, performs a method for non-visually mapping an environment, the method comprising: capturing, from a video capture device worn by a user, a set of images that is within a field of view of the user; identifying environmental text within the set of images; generating an aural contextual indicator corresponding to the environmental text, the aural contextual indicator indicating an informational nature of the environmental text; creating an aural map of the environment using a sequence of generated aural contextual indicators; and delivering the aural map of the environment to the user via an aural output device worn by the user in response to a user request.

Still yet, any of the components of the present invention could be deployed, managed, serviced, etc., by a service provider who offers to implement passive monitoring in a computer system.

Embodiments of the present invention also provide related systems, methods, and/or program products.

BRIEF DESCRIPTION OF THE DRAWINGS

These and other features of this invention will be more readily understood from the following detailed description of the various aspects of the invention taken in conjunction with the accompanying drawings in which.

Figure 1:
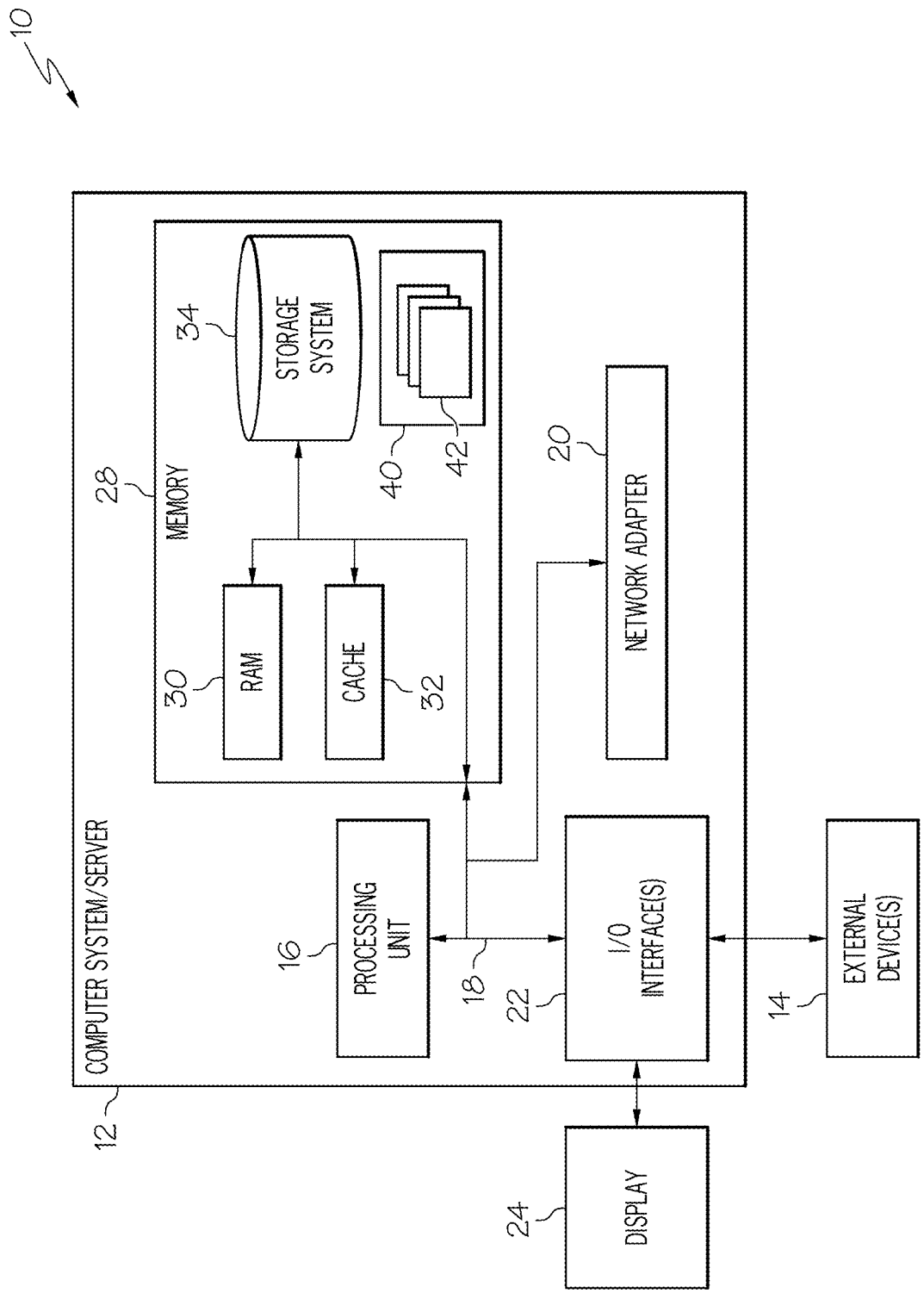
FIG. 1 depicts a data processing system according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which embodiments are shown. This disclosure may, however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As indicated above, aspects of the present invention provide an approach for non-visually mapping an environment. In an embodiment, a set of images that is within the field of view of the user is captured from a video capture device worn by the user. Environmental text that is within the set of images is identified. An aural contextual indicator that corresponds to the environmental text is then generated. This aural contextual indicator indicates the informational nature of the environmental text. An aural map of the environment is created using a sequence of the generated aural contextual indicators. This aural map is delivered to the user via an aural output device worn by the user in response to a user request.

Referring now to FIG. 1, a schematic of an example of a data processing system is shown. Data processing system 10 is only one example of a suitable data processing system and is not intended to suggest any limitation as to the scope of use or functionality of embodiments of the invention described herein. Regardless, data processing system 10 is capable of being implemented and/or performing any of the functionality set forth hereinabove.

In data processing system 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on, that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in data processing system 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
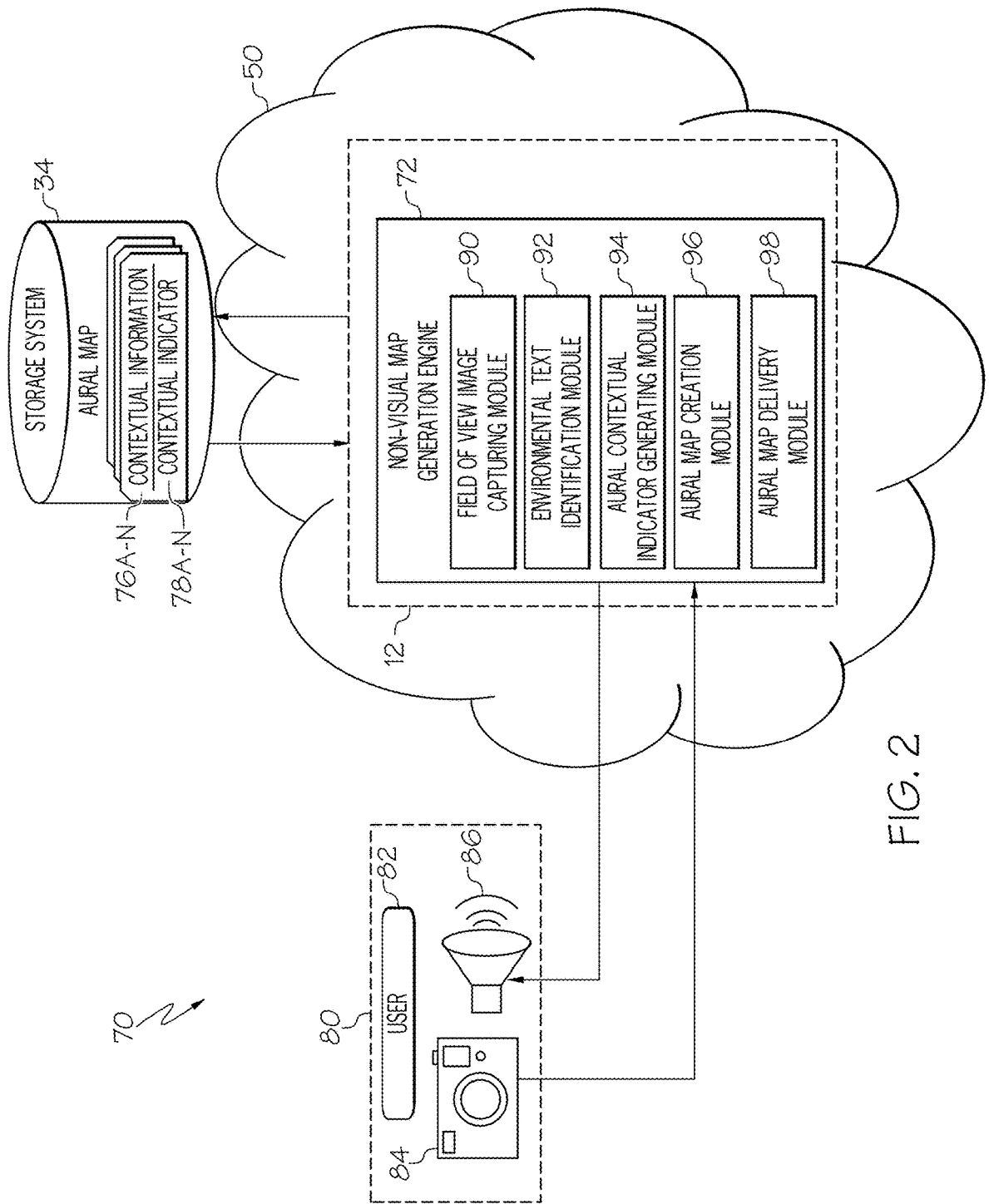
FIG. 2 depicts a system diagram according to an embodiment of the present invention.

Referring now to FIG. 2, a system diagram describing the functionality discussed herein according to an embodiment of the present invention is shown. It is understood that the teachings recited herein may be practiced within any type of networked computing environment 70 (e.g., a cloud computing environment 50). A stand-alone computer system/server 12 is shown in FIG. 2 for illustrative purposes only. In the event the teachings recited herein are practiced in a networked computing environment 70, each equipped user 80 need not have a visual to aural conversion engine (hereinafter "system 72"). Rather, system 72 could be loaded on a server or server-capable device that communicates (e.g., wirelessly) with equipped user 80 to provide processing therefor. Regardless, as depicted, system 72 is shown within computer system/server 12. In general, system 72 can be implemented as program/utility 40 on computer system 12 of FIG. 1 and can enable the functions recited herein. It is further understood that system 72 may be incorporated within or work in conjunction with any type of system that receives, processes, and/or executes commands with respect to processing of audio/visual information (e.g., in a cognitive and/or network computing environment). Such other system(s) have not been shown in FIG. 2 for brevity purposes.

Along these lines, system 72 may perform multiple functions similar to a general-purpose computer. Specifically, among other functions, system 72 can non-visually (e.g., aurally) map an environment. To accomplish this, system 72 can include: a field of view image capturing module 90, an environmental text identification module 92, an aural contextual indicator generating module 94, an aural map creation module 96, and an aural map delivery module 98.

Figure 3A:
FIGS. 3A-B depict example environments according to an embodiment of the present invention.
Figure 3B:

Referring now to FIGS. 3A-B, example environments 100A, 100B containing textual information are shown according to an embodiment of the invention. As shown, environment 100A is an outdoor cityscape while environment 100B is an indoor restaurant environment. In any case, each of environments 100A, 100B have a number of different communications delivery elements 102A-X (generically 102N), each of which are intended to communicate information visually to a user 82 (FIG. 2). As shown, some of communications delivery elements 102A-X include text in the form of natural language-based communications, other communications delivery elements 102A-X include symbolic communications (e.g., pictures, logos, trademarks, abbreviations, etc.), and still other communications delivery elements 102A-X include both natural language and symbolic forms of communication. As further shown, communications delivery elements 102A-X can take many forms, such as, but not limited to: street signs, location indicators, alerts, billboard advertisements, scrolling information tickers, and/or the like. It should be understood that although specific environments 100A, 100B and communications delivery elements 102A-X have been illustrated, any type of environment and/or communications delivery element that is now known or may be later developed can be envisioned for the purpose of this invention.

However, the ability to deliver information to a user 82 about environments 100A-B that include delivery elements 102A-X, such as the ones illustrated, may fail to effectively reach certain segments of the population, such as those that are visually impaired. The inventors of the invention described herein have discovered that current solutions for rectifying these deficiencies often fall short. For example, current solutions to aid sight-impaired people in their navigation through the world, such as walking canes, seeing-eye dogs, tonal warning devices, etc., lack the ability to interpret the information in such communications delivery elements 102A-X. For example, some devices may provide read-aloud capabilities, but these devices lack the sophistication to process much more than text in a handheld piece of paper. Alternatively, a seeing-eye dog has cognition but lacks the expressive language to describe the world to user 82. As such, none of the currently available solutions provides the combination of cognition to capture and classify the environmental visual information with aural "read-aloud" capabilities that the sight-impaired or other person that may not be able to interpret such information is able to understand. Moreover, none of these solutions has the ability to provide non-visual information about environments 100A-B to people who may not be physically present in the environment.

The current embodiments solve these and/or other problems in the current solutions by converting visual textual information, which the user may not have the ability to see and/or understand, in the user's environment to a format that user 80 can understand and to store it for later access by the same or a different user 80. This format can include indications of the context of the environmental text, vocalizations of the environmental text, translations of the environmental text, etc., all of which are delivered aurally to user 80. This improves the operation of a computer system by enabling the computer system to provide the user 80 with the ability to "re-visit" a previously visited location and/or to preview a location that user 80 has never visited, allowing the user 80 access to information that the user 80 would otherwise be unable to obtain. Further, the context delivered by the current embodiments to the user 80 allows the user 80 to understand the information and its place/significance within the environment that the user 80 desires to know more about.

Referring again to FIG. 2, field of view image capturing module 90 of system 72, as executed by computer system/server 12, is configured to capture a set of images that is within a field of view of user 82. In an embodiment, these images are intended to imitate or simulate the images that user 82 should be seeing within the environment (e.g., that a person who is not visually impaired would be seeing from the same vantage point). Alternatively, these images could be captured in a wide angle (e.g., between 180 and 360 degrees), allowing for collection of images on an entire or substantial amount of an environment at once. In any case, these images can be captured in a streaming manner, can be captured periodically (e.g., every second, every few seconds, etc.), or a combination of the two (e.g., periodic capture with event-based streaming). To this extent, one or more video capture devices can be utilized to capture the image(s). The one or more video capture devices can include a still photographic camera, a video camera, or a combination of the two. In any case, each image can be paired with a location indicator (e.g., longitude/latitude, global positioning system (GPS) coordinates, and/or the like) of the video capture device; a direction indicator (north, south, east, west, etc.) that indicates an orientation of a particular video capture device in the environment and/or an orientation of the image itself with respect to the environment, and/or any other location information necessary for specifying a location within an environment.

Figure 4:
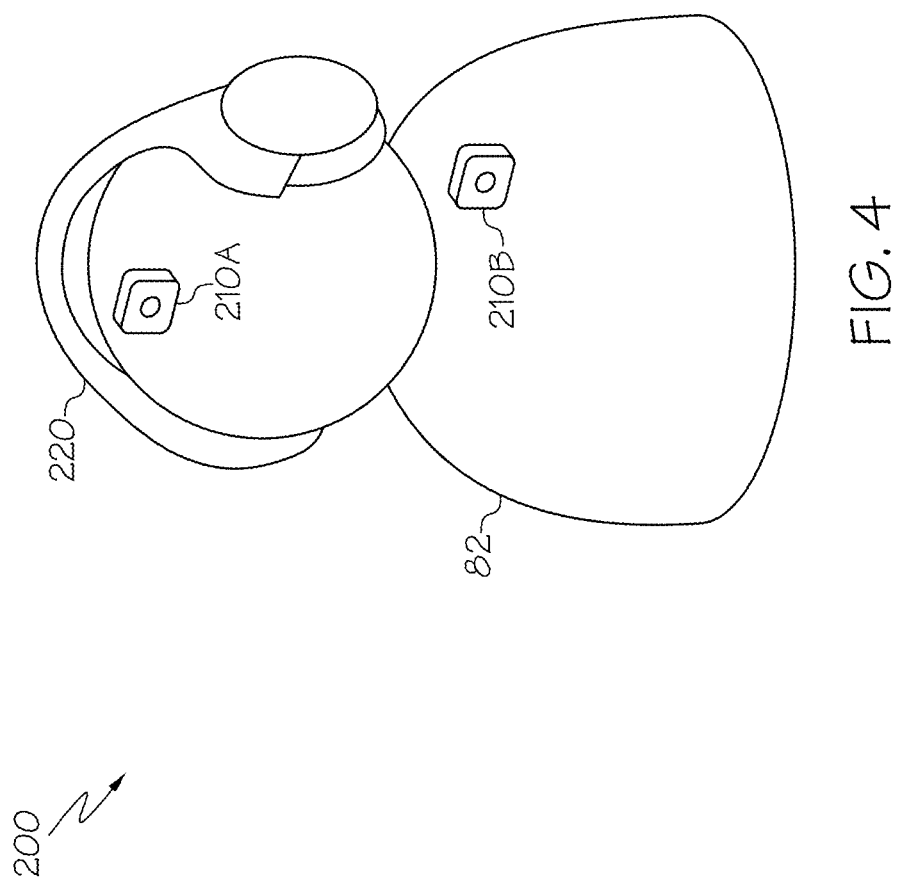
FIG. 4 depicts an example diagram of an equipped user according to an embodiment of the present invention.

Referring now to FIG. 4, an example diagram 200 of equipped user 80 (FIG. 2) is depicted according to an embodiment of the current invention. As shown, diagram 200 includes a number of video capture devices 210A-B (generically video capture device 210N). Although as illustrated, video capture devices are shown equipped on a human user 82, it should be understood that any platform now known or later developed could be used for capturing the set of images, including, but not limited to, a service animal, a vehicle, an automated vehicle, an unmanned aerial vehicle, etc. In any case, as shown, user 82 can be equipped with video capture device 210N in any manner that is now known or later developed including, but not limited to, affixed directly to the skin of user 82 (e.g., with an adhesive), affixed to an article of clothing of user 82 (e.g., hat, headband, shirt, jacket, pants, skirt, dress, belt, wristband, and/or the like), etc. Additionally, or in the alternative, video capture device 210N can be included in or affixed to an accessory that is used or worn by user 82 including, but not limited to: eyeglasses, a hair accessory, a necklace, a ring, a wristwatch, a bracelet, a cane, and/or the like. As such, user 82 can be equipped with video capture device 210N on any part relative to the body of user 82.

In an embodiment, at least one video capture device 210N is a panoramic device or other wide angle device or set of devices that is designed to capture image data from the front, back and/or sides of user 80. Additionally or in the alternative, at least one video capture device 210N can be a high-acuity head-mounted device that may be optionally supplemented with at least one other video capture device 210, which can be a low-acuity device mounted elsewhere (e.g., on a wrist) of user 80. In this embodiment, the high-acuity head-mounted device can capture information that is in front of user 82 while other devices gather information in the periphery.

Referring again to FIG. 2, environmental text identification module 92 of system 72, as executed by computer system/server 12, is configured to identify environmental text within the set of images captured by field of view capturing module 90. Referring additionally to FIGS. 3 and 4, in an embodiment, environmental text identification module 92 can perform this task as images in the field of view of user 82 are captured by video capture device 84. Additionally or in the alternative, the images can be stored (e.g., in storage system 34) and environmental text identification module 92 can perform the task at a later time (e.g., in response to a request by user 80). In any case, environmental text identification module 92 can scan the images to identify elements 102A-X that contain text, symbols, or both. In an embodiment this function and/or any other function of system 72 can be performed by a cognitive system, such as IBM's Watson Search or Watson Explorer (IBM is a registered trademark and Watson is a trademark of International Business Machines Corporation). In any case, once elements 102A-X having environmental text have been identified, these elements can be associated with the location information paired with the captured images. Moreover, these elements can be further analyzed to discover contextual information 76A-N about the elements. For example, the textual and/or symbolic information within each element 102N can be analyzed using optical character recognition (OCR) technology to determine whether the elements contain words or merely symbolic information.

Recognized words and/or symbols can then be searched (e.g., by a cognitive system, against a database, on a social media site, using web search engine, etc.) to gain further contextual information 76A-N. For example, searches for the terms "JULIA ROBERTS", "CLIVE OWEN", and "DUPLICITY" of elements 102D-G would discover that these elements were related and that they were all included in an advertisement for a movie. In addition, the search results can be compared against a location of user 82 (e.g., from a global positioning system (GPS) receiver, wireless triangulation, etc.) to capture even more precise contextual information 76A-N about the identified environmental text. For example, a search for the term "Times Sq-42 St Station" of element 102H combined with the location of user 82 could indicate that the environmental text describes the location of a nearby subway stop. This information can then be used to provide context to nearby elements 102I-M. Similarly, a search for the term "GAP" in element 102A could discover that it is the name of a store and the combination of this information with the location of user 82 could indicate that the environmental text describes the entrance to the store and not merely an advertisement for the store.

In addition, environmental text identification module 92 can provide contextual information 76A-N that classifies the environmental text according to a number of visual characteristics of the environmental text. These visual characteristics can include, but are not limited to: horizontal (e.g., left-right) location of the environmental text within the field of view of user 80, vertical elevation of environmental text within the field of view of user 80, whether the environmental text is scrolling, and/or the like. For example, element 102R could be classified as being relatively elevated and relatively large while element 102X could be classified as having a lower elevation and being relatively small. Similarly, element 102U could be classified as being to the left in the field of view of user 82 and having scrolling text while element 102T could be classified as being to the right in the field of view of the user.

Additionally, or in the alternative, contextual information 76A-N provided by environmental text identification module 92 can be used to classify the movement of the environmental text relative to user 80. In order to accomplish this, the environmental text contained in the same element 102N can be compared over a plurality of successive images collected by field of view image capturing module 90 to observe a change in the relative size of the environmental text from one image to the next. The results of this comparison can be analyzed based on a movement speed of user 80 and/or the change in relative size of the environmental text located in other elements 102A-X in the successive images over the same time period to determine whether the environmental text is moving relative to (e.g., toward or away from) user 80. To this extent, environmental text identification module 92 can be able to distinguish environmental text that is stationary from environmental text that is in motion (e.g., is located on an automobile, trolley, train, etc., which is moving toward or away from user 80).

Aural contextual indicator generating module 94 of system 72, as executed on computer system/server 12, is configured to generate an aural contextual indicator 78A-N (generically 78N) that corresponds to the environmental text. Each generated aural contextual indicator 78A-N is a sound that communicates to user 82 contextual information 76A-N that has been identified as corresponding to the environmental text. In any case, the aural contextual indicator 78A-N includes an indication of the informational nature of the environmental text. The sound produced by a particular aural contextual indicator 78N can be assigned automatically or, alternatively, can be selected by user 82 (e.g., using a user interface) to reflect the contextual information 76A-N being conveyed.

For example, aural contextual indicator 78N corresponding to element 102A could include a sound of an opening door or of a ringing bell to indicate the contextual information 76N that the environmental text indicates the entrance to a store. Similarly, aural contextual indicator 78N corresponding to element 102V could include a sound of silverware on plates or of a bottled beverage being opened to indicate the contextual information 76N that the environmental text indicates a restaurant or bar. Similarly, an advertisement could be indicated by aural contextual indicator 78N having the sound of money clinking or a cash register; a restroom (e.g., element 102T) could be indicated by aural contextual indicator 78N having the sound of a flushing toilet; a subway could be indicated by aural contextual indicator 78N having the sound of a train; a street name could be indicated by aural contextual indicator 78N having a "beep" or "boop" sound or the sound of walking feet or car noises; a sign indication a warning or danger could be indicated by aural contextual indicator 78N having the sound of an alarm or siren; scrolling text could be indicated by aural contextual indicator 78N having a scratching sound, the sound of a ticker tape machine; etc. It should be understood that the examples listed herein are not meant to be limiting. Rather, different aural contextual indicators 78A-N having different sounds could be used to communicate the contextual information 76A-N listed above. Additionally or in the alternative, other contextual information 76A-N not specifically listed herein could be indicated by aural contextual indicators 78A-N having these or other sounds.

Aural map creation module 96 of system 72, as executed on computer system/server 12, is configured to create an aural map 74 of environment using a sequence of generated aural contextual indicators 78A-N. To accomplish this, aural map creating module 96 can upload each generated aural contextual indicator 78N (e.g., with location information and/or other contextual information) to a machine learning repository and uploaded contextual indicator 78N can be aggregated in sequence with other generated and uploaded contextual indicators 78A-N to form an aural map 74 that can be assessed by user 82 and/or other users 82. In an embodiment, this uploading can be performed in conjunction with a real-time delivery of aural contextual indicators 78N to user 82. Alternatively (e.g., in cases in which set of images is generated by image capture devices that are not mounted on user 82), the uploading can be performed without delivering uploaded contextual indicators 78A-N to user 82. Additionally, or in the alternative, the generated contextual indicators 78A-N can be generated and stored locally and can be uploaded in a batch transaction (e.g., when a wired and/or relatively high speed wireless connection is available).

In any case, in an embodiment, each aural map 74 can include a sequence of generated aural contextual indicators 78A-N, which may include associated location data, that has been generated by a single user 82 during a single journey to and/or within environment. These aural maps 74 can be stored in a repository (e.g., indexed according to one or more locations included therein), which can be searched by user 80 and/or or other users 82 who wish to have non-visual mapping information about environment. Alternatively, aural contextual indicators 78A-N generated based on images captured in one or more sessions by user 82 and/or other users 82 can be aggregated (e.g., by a cognitive system) to form a comprehensive aural map 74. For example, based on the generated contextual indicators 78A-N and associated location data, each element in the environment can be mapped to a location within a three-dimensional (3-D) virtual representation of the environment, which can be accessed and navigated by any user 82.

Aural map delivery module 98 of system 72, as executed on computer system/server 12, is configured to forward aural contextual indicator 78N to user 82 via an aural output device 86 worn by user 82. To do so, aural map delivery module 98 can provide an interface (e.g., an aural user interface) into which a user 82 can specify at least one environmental location for which non-visual mapping data is wanted. These specified environmental location(s) could include a single location (e.g., a landmark, an intersection of two cross streets, the inside of an establishment, and/or the like), a beginning and ending location, a sequence of locations along a route, and/or the like. Aural map delivery module 98 can play a portion of aural map that corresponds to the specified environmental location(s) via aural output device 86. In an embodiment in which individual aural maps 74 are stored in a repository, one or more aural maps 74 or portions of one or more aural maps 74 that correspond to the specified locations can be provided to aural output device 86.

Alternatively, in embodiments in which aural map 74 includes a comprehensive 3-D representation of the environment, aural map delivery module 98 may deliver aural map 74 of the specified location to user 82 as a virtual environment. In this embodiment, aural map delivery module 98 can designate an orientation of user 82 to be used during the playing of the aural map to user 82. Based on this orientation, a focus area for the user 82 within the virtual environment can be defined. The user can provide navigation commands (e.g., verbally, using a motion detecting headset or other body orientation sensor, using a keyboard, using an attached device, etc.) to navigate and/or change direction within the virtual environment. As the user navigates within the virtual environment, the focus area of the user will change to reflect the updated location and orientation of the user within the virtual area, and environmental text within the virtual environment will be communicated to the user 82 based on the focus area. For example, for elements 102A-X having environmental text identified within the focus area can be converted into a vocalization and incorporated with the corresponding aural contextual indicators 78A-N in the forwarding. Conversely, for elements 102A-X having environmental text that is identified as being outside the focus area, the aural contextual indicators 78A-N corresponding to the environmental text can be provided without the vocalization of a content of the environmental text.

Figure 5B:
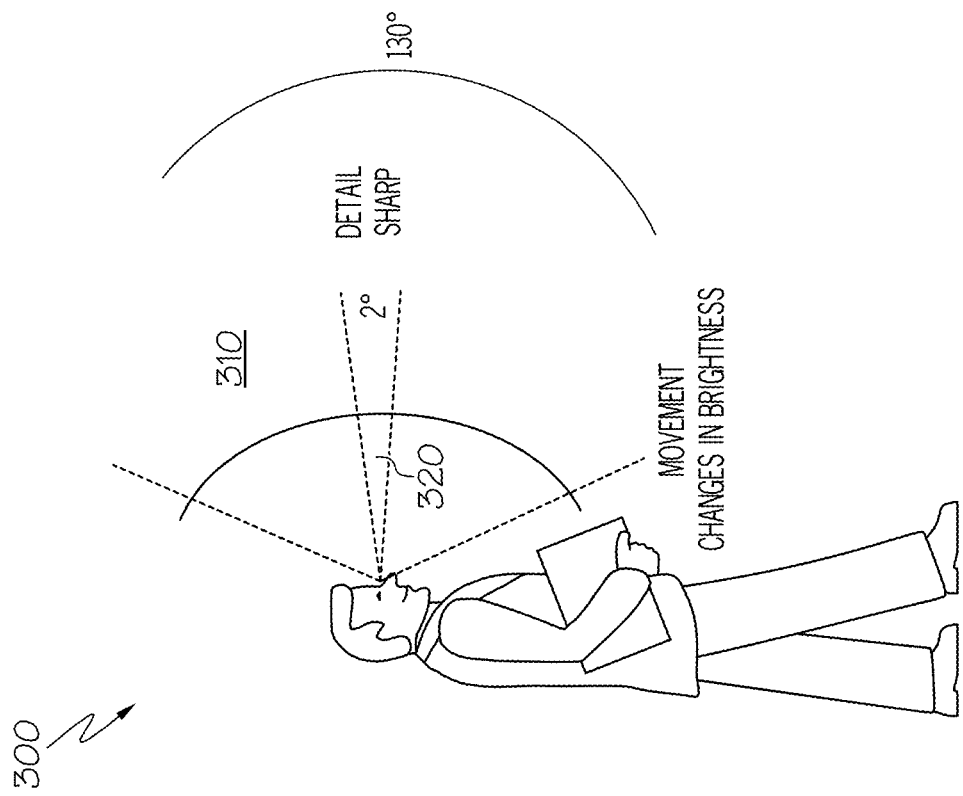
FIGS. 5A-B depict example prospective diagrams according to an embodiment of the present invention.
Figure 5A:
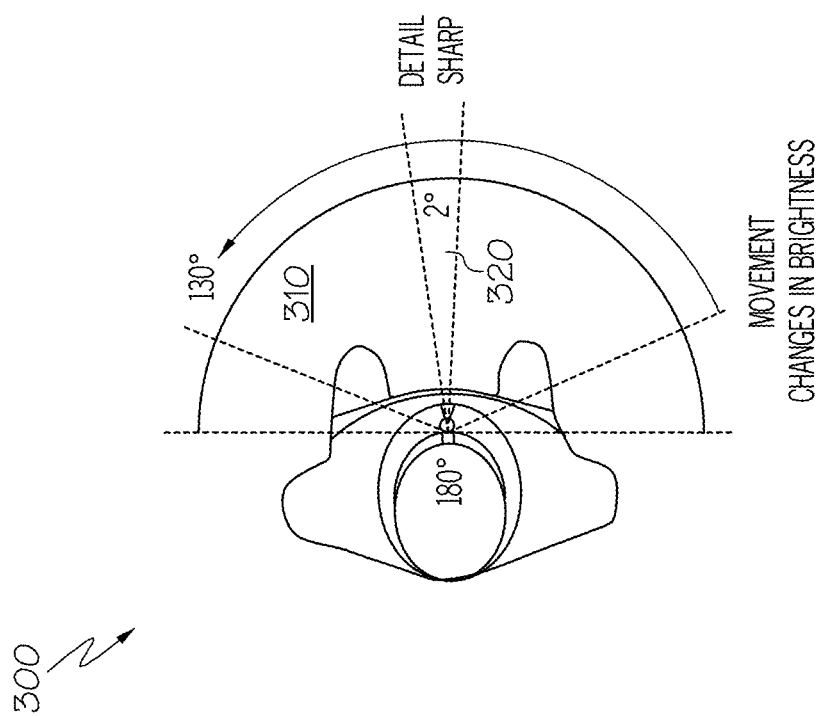

Referring now to FIGS. 5A-B, prospective diagrams 300 of the utilization of such a focus area 320 in virtual environment-based aural map 74 is shown according to embodiments of the invention. As shown, aural map 74 is designed such that elements 102A-X that are communicated to user 82 are limited to those in a field of view 310 that is 130 degrees vertically and 130 degrees horizontally to simulate a field of view 310 of someone who is not visually impaired. Within this field of view 310, focus area 320 has been defined in a center region (e.g., at or within 5 degrees of the exact center) of field of view 310. As illustrated, focus area 320 has been defined at 2 degrees vertically and 2 degrees horizontally, to simulate an area that a typical person who is not visually impaired is able to focus in sharp detail. As stated above, in an embodiment, only aural contextual indicators 78A-N are forwarded to user 82 for environmental text that is located outside focus area 220. Conversely, aural contextual indicators 78A-N for environmental text that is within focus area 220 are forwarded in combination with a vocalized interpretation of the environmental text that has been converted into speech.

Whatever the case, referring again to FIG. 2, in an embodiment, aural map delivery module 98 can deliver aural contextual indicator 78N to user 82 in isolation (e.g., without providing the content of the environmental text). Alternatively, all or a portion of aural contextual indicators 78A-N associated with elements 102A-X in the field of view of user 82 can be accompanied (e.g., preceded by, followed by, or concurrently with) an interpretation of the environmental text (e.g., that has been converted using voice to text technology) or a description of the common meaning of an identified symbol. For example, in the case of scrolling text, the content of the text can be converted to speech and provided to user 80 in real time while, at the same time, an aural contextual indicator 78N that coveys contextual information 76N that the environmental text is scrolling text is playing in the background.

In an embodiment, the interpretation of the environmental text can include a translation of the environmental text into a preferred language of user 80. In order to accomplish this, the preferred language of user 80 can be specified. The environmental text identified by environmental text identification module 92 can be analyzed to determine whether it is in the preferred language. If it is determined that the environmental text is not in the preferred language, but is in a language that is foreign to user 80, the environmental text can be forwarded to a translation utility to obtain a translation of the environmental text in the preferred language of user 80. This translation can then be converted to speech and can be provided to user 80 as a vocalization. In an embodiment, both the vocalization of the translated environmental text as well as a vocalization of the environmental text in the original foreign language can be provided to user 80 (e.g., along with aural contextual indicators 78A-N associated with elements 102A-X).

In any case in embodiments, aural map delivery module 98 is also able to introduce additional context to aural contextual indicators 78A-N being forwarded to user 82. For example, when aural output device 86 is a stereo earphone device 220 (FIG. 4), the lateral (e.g., horizontal) location of an element 102N having environmental text can be indicated by playing the corresponding aural contextual indicator 78N relatively louder in one ear than in the other ear (e.g., by a predetermined number of decibels per degree from center). So, for instance, if the environmental text was located 15 degrees to the right of the center of field of view 210 (FIG. 5), the corresponding aural contextual indicator 78N would sound slightly louder in the right ear than in the left ear of user 82. Conversely, if environmental text was located 125 degrees to the left, aural contextual indicator 78N would have all or substantially all sound played in the left ear with no or almost no sound in the right ear.

In addition or in the alternative, additional context added to aural contextual indicators 78A-N being forwarded to user 82 can indicate a vertical orientation of environmental text within field of view (FIG. 5). For example, a pitch at which aural contextual indicator 78N is played can be increased or decreased (e.g., by a predetermined amount of hertz per degree of inclination/declination) such that the pitch of aural contextual indicator 78N is relatively higher for environmental text that is above a plane of field of view 210 (FIG. 5) and the pitch of aural contextual indicator 78N is relatively lower for environmental text that is below a plane of the field of view. Additionally or in the alternative, additional context can be added by playing aural contextual indicator 78N with a volume that is relatively louder for environmental text that is relatively larger or a volume that is relatively lower for environmental text that is relatively smaller.

Additionally or in the alternative, additional context can be added by playing aural contextual indicator 78N with a Doppler effect sound for environmental text that is moving relative to (e.g., toward or away from) user 80. For example, aural contextual indicator 78N can be played with an increasing pitch for environmental text that is moving toward user 80 and can be played with a decreasing pitch for environmental text that is moving away from user 80.

Figure 6:
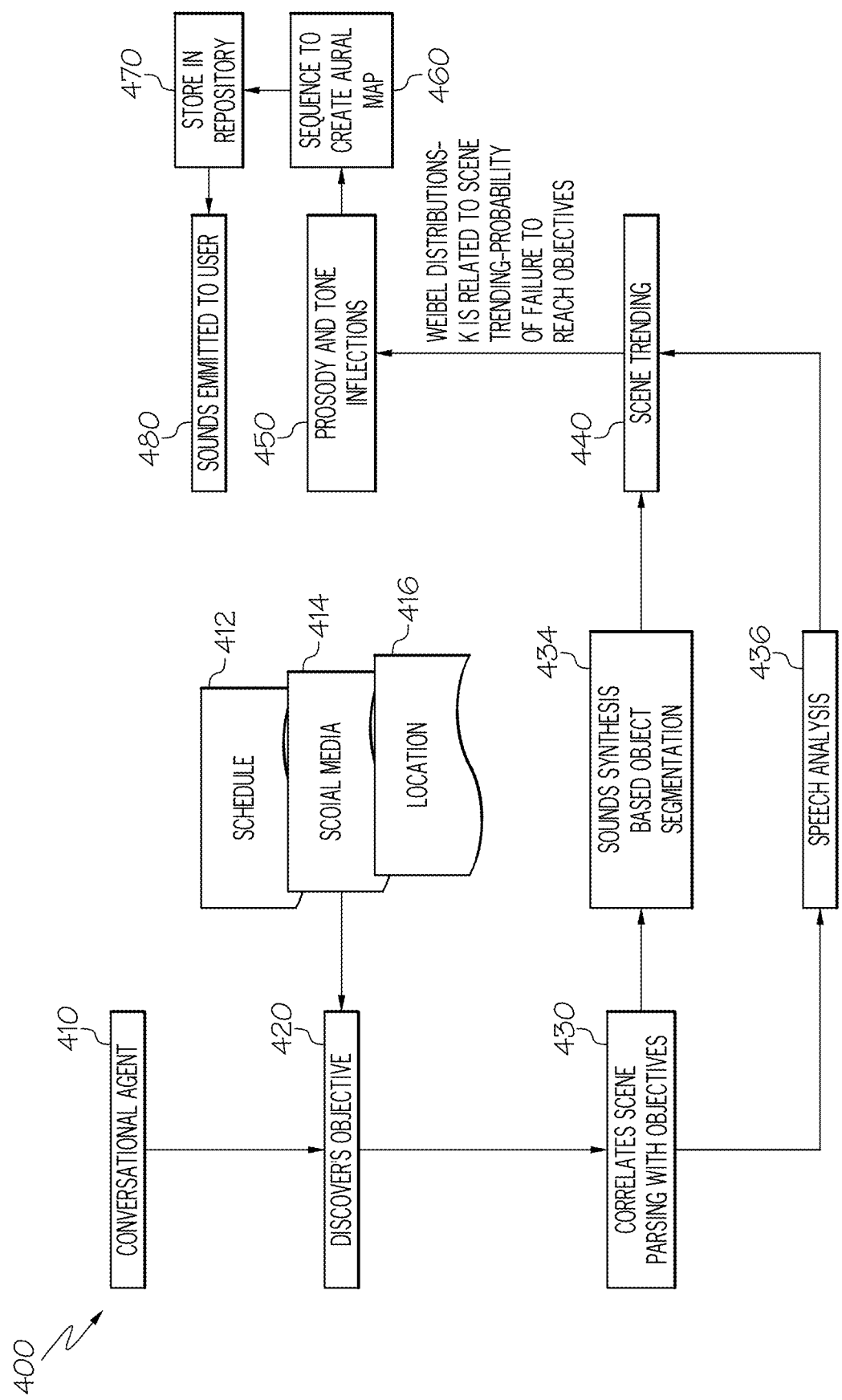
FIG. 6 depicts an example data flow diagram according to an embodiment of the present invention.

Referring now to FIG. 6, a data flow diagram 400 of an additional way in which the teachings of the current invention can be utilized is shown according to an embodiment of the invention. Referring additionally to FIG. 2, in this embodiment, equipped user 80 can utilize system 72 to predict whether equipped user 80 will reach a desired objective within a specific time period. To accomplish this, a conversational agent 410 incorporated into system 72 can receive voice commands from user 82. Based on these voice commands, as well as, optionally, information from a schedule 412 of user 82 (e.g., stored in a scheduling application of a mobile device of user 82), social media 414, and/or location 416 data, user's 82 objectives (e.g., a location that user 82 wants to travel to and a time or amount of time for arriving at the location) can be discovered 420. System 72 can then correlate 430 the set of images captured by field of view image capturing module 90 and the environmental text identified by environmental text identification module 92 with user 82 objective(s) to produce sound synthesis based object segmentation 434 and/or speech synthesis 436 that indicates user's 82 progress toward objective(s). As user 82 progresses, scene trending 440 analysis can be used to determine a likelihood user 82 will accomplish his/her objective(s) in the specified time. This analysis uses a Weibel Distribution based on the trend to determine a probability of failure to reach user's objective(s). The equation for determining this probability is as follows:

$$f(x; \lambda, k) = \begin{cases} \frac{k}{\lambda}\left(\frac{x}{\lambda}\right)^{k-1} e^{-(x/\lambda)^k} & x \geq 0, \\ 0 & x < 0, \end{cases}$$

where x is the time period. For example, assume that the analysis aims to calculate the probability that user 80 can reach the objective(s) (e.g., crossing the road) if user 82 begins now and takes 10 minutes (current walking rate). The variables lambda and kappa are determined from scene trending.

When k<1, failure decreases over time (traffic is decreasing)
When k=1, the failure is constant
When k>1, the failure rate increases over time (traffic is increasing)
Lambda is the intensity of scale parameter—how important is crossing the road.

In any case, based on the analysis, aural contextual indicator generating module 94 can generate prosody and tone inflections 450 that indicate the results of the analysis. These generated sounds can be arranged in a sequence 460 by aural map creation module 98 to create aural map 74 and aural map 74 can be stored 470 in a repository (e.g., storage system 34). These generated sounds can be delivered to user 82 from the repository via aural map delivery module 98 and emitted 460 to user 82.

Figure 7:
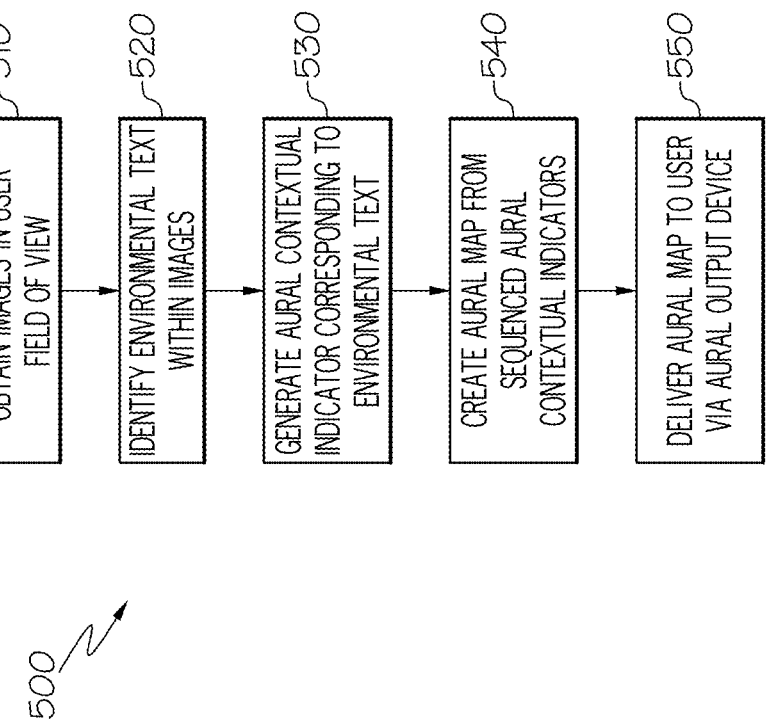
FIG. 7 depicts an example process flowchart according to an embodiment of the present invention.

Referring now to FIG. 7 in conjunction with FIG. 2, a process flowchart 300 according to an embodiment of the present invention is shown. At 510, field of view image capturing module 90 of system 72, as executed by computer system/server 12, captures a set of images that is within a field of view of user 82 from video capture device 84 worn by user 82. At 520, environmental text identification module 92 of system 72, as executed by computer system/server 12, identifies environmental text within the captured set of images. At 530, aural contextual indicator generating module 94 of system 72, as executed by computer system/server 12, generates an aural contextual indicator 78N corresponding to the environmental text. This aural contextual indicator 78N indicates the informational nature of the environmental text. At 540, aural map creation module 96 of system 72, as executed by computer system/server 12, creates aural map 74 using a sequence of aural contextual indicators 78A-N. Finally, at 550, aural map delivery module 98 of system 72, as executed by computer system/server 12, delivers aural map 74 to user 82 in response to a request by user 82.

The process flowcharts of FIGS. 6 and 7 illustrate the architecture, functionality, and operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order depicted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

While shown and described herein as an approach for non-visually mapping an environment, it is understood that the invention further provides various alternative embodiments. For example, in one embodiment, the invention provides a method that performs the process of the invention on a subscription, advertising, and/or fee basis. That is, a service provider, such as a Solution Integrator, could offer to provide functionality for non-visually mapping an environment. In this case, the service provider can create, maintain, and support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In another embodiment, the invention provides a computer-implemented method for non-visually mapping an environment. In this case, a computer infrastructure, such as computer system 12 (FIG. 1), can be provided and one or more systems for performing the processes of the invention can be captured (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, system 72 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may also be a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media/(e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It is apparent that there has been provided approaches for non-visually mapping an environment. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

Some embodiments of the present invention may include one, or more, of the following features, characteristics, advantages and/or operations: (i) uses crowd labeling with consensus to achieve well known/accepted labels that can build models for a wide audience as opposed to building a model directed toward a single person; (ii) includes a "find object mode" where the user tells a wearable apparatus (for example, smart goggles) to look for a predetermined object, like a dropped credit card; (iii) a zoom in/zoom out feature (may also herein be referred to as "focusing") so that the user can zoom in or out an image (for example still image, set of video images) captured by the wearable apparatus depending upon whether the user is looking for something that is probably relatively far away (for example, a washroom sign in an unfamiliar building), or something close up (for example, a jug of apple cider that the user has placed on her kitchen counter in her house); and/or (iv) uses crowd-sourced machine training based on images captured by a wearable apparatus when a user makes a trip (for example, a walk to the local community center).

What is claimed is:

1. A method for non-visually mapping an environment, comprising:
   capturing, from a video capture device mounted on a recorder at a first location, a set of images that is within a field of view of the recorder;
   identifying environmental text within the set of images;
   generating an aural contextual indicator corresponding to the environmental text, the aural contextual indicator indicating an informational nature of the environmental text;
   creating an aural map of the environment using a plurality of vocalizations of the environmental text that are arranged in sequence from the first location to a second location, wherein each vocalization of the environmental text is augmented using the computer-generated aural contextual indicator that corresponds to the environmental text; and
   automatically delivering the aural map of the environment to a user who is an end user at a second location that is remote from the first location via an aural output device worn by the user in response to a user request by the user, such that the computer-generated aural contextual indicators together with the vocalization of the associated environmental text contained in the aural map are communicated in sequence aurally to the user who is not physically present in the environment.

2. The method of claim 1, further comprising:
   uploading the sequence of generated aural contextual indicators to a machine learning repository; and
   aggregating the sequence of generated aural contextual indicators with other aural contextual indicators to create the aural map of the environment.

3. The method of claim 2, wherein the other aural contextual indicators are generated from images captured by other users.

4. The method of claim 1, the delivering further comprising:
   specifying, by a user, at least one environmental location; and
   providing the user with an ability to re-visit a previously visited location by playing a portion of the aural map corresponding to the at least one environmental location via the aural output device from the second location.

5. The method of claim 4, the playing of the portion of the aural map further comprising:
   designating an orientation of the user to be used during the playing;
   defining a focus area based on the orientation of the user;
   converting the environmental text identified within the focus area into a vocalization; and
   incorporating the vocalization with the corresponding aural contextual indicators in the forwarding,
   wherein the aural contextual indicator corresponding to the environmental text identified outside the field of view is provided without the vocalization of a content of the environmental text in the forwarding.

6. The method of claim 5,
   wherein the aural output device is a stereo earphone device, and
   wherein the aural contextual indicator indicates at least one of a lateral location of the corresponding environmental text, a size of the environmental text, a relative height of the environmental text, or a content type of the environmental text.

7. The method of claim 4, wherein the at least one environmental location specified by the user includes a beginning location and an ending location, the automatically delivering further comprising:
   retrieving a plurality of aural maps corresponding to a plurality of locations along a route between the starting location and the ending location; and
   providing each of the plurality of aural maps to the aural output device in a sequence from the starting location to the ending location.

8. A system for non-visually mapping an environment, comprising:
   a video capture device mounted on a recorder;
   an aural output device worn by a user; and
   at least one computer device in communication with the video capture device and the aural output device that causes the system to perform a method, comprising:
      capturing, from the video capture device at a first location, a set of images that is within a field of view of the recorder;
      identifying environmental text within the set of images;
      generating an aural contextual indicator corresponding to the environmental text, the aural contextual indicator indicating an informational nature of the environmental text;
      creating an aural map of the environment using a plurality of vocalizations of the environmental text that are arranged in sequence from the first location to a second location, wherein each vocalization of the environmental text is augmented using the computer-generated aural contextual indicator that corresponds to the environmental text; and automatically delivering the aural map of the environment to a user who is an end user at a second location that is remote from the first location via an aural output device worn by the user in response to a user request by the user, such that the computer-generated aural contextual indicators together with the vocalization of the associated environmental text contained in the aural map are communicated in sequence aurally to the user who is not physically present in the environment.

9. The system of claim 8, the method further comprising:

uploading the sequence of generated aural contextual indicators to a machine learning repository; and aggregating the sequence of generated aural contextual indicators with other aural contextual indicators to create the aural map of the environment.

10. The system of claim 9, wherein the other aural contextual indicators are generated from images captured by other users.

11. The system of claim 8, the delivering further comprising:

specifying, by a user, at least one environmental location; and providing the user with an ability to re-visit a previously visited location by playing a portion of the aural map corresponding to the at least one environmental location via the aural output device from the second location.

12. The system of claim 11, the playing of the portion of the aural map further comprising:

designating an orientation of the user to be used during the playing;

defining a focus area based on the orientation of the user;

converting the environmental text identified within the focus area into a vocalization; and incorporating the vocalization with the corresponding aural contextual indicators in the forwarding, wherein the aural contextual indicator corresponding to the environmental text identified outside the field of view is provided without the vocalization of a content of the environmental text in the forwarding.

13. The system of claim 12, wherein the aural output device is a stereo earphone device, and wherein the aural contextual indicator indicates at least one of a lateral location of the corresponding environmental text, a size of the environmental text, a relative height of the environmental text, or a content type of the environmental text.

14. The system of claim 11, wherein the at least one environmental location specified by the user includes a beginning location and an ending location, the automatically delivering further comprising:

retrieving a plurality of aural maps corresponding to a plurality of locations along a route between the starting location and the ending location; and providing each of the plurality of aural maps to the aural output device in a sequence from the starting location to the ending location.

15. A computer program product embodied in a computer readable storage medium that, when executed by a computer device, performs a method for non-visually mapping an environment, the method comprising:

capturing, from a video capture device mounted on a recorder at a first location, a set of images that is within a field of view of the recorder;

identifying environmental text within the set of images;

generating an aural contextual indicator corresponding to the environmental text, the aural contextual indicator indicating an informational nature of the environmental text;

creating an aural map of the environment using a plurality of vocalizations of the environmental text that are arranged in sequence from the first location to a second location, wherein each vocalization of the environmental text is augmented using the computer-generated aural contextual indicator that corresponds to the environmental text; and automatically delivering the aural map of the environment to a user who is an end user at a second location that is remote from the first location via an aural output device worn by the user in response to a user request by the user, such that the computer-generated aural contextual indicators together with the vocalization of the associated environmental text contained in the aural map are communicated in sequence aurally to the user who is not physically present in the environment.

16. The program product of claim 15, the method further comprising:

uploading the sequence of generated aural contextual indicators to a machine learning repository; and aggregating the sequence of generated aural contextual indicators with other aural contextual indicators to create the aural map of the environment, wherein the other aural contextual indicators are generated from images captured by other users.

17. The program product of claim 15, the delivering further comprising:

specifying, by a user, at least one environmental location; and providing the user with an ability to re-visit a previously visited location by playing a portion of the aural map corresponding to the at least one environmental location via the aural output device from the second location.

18. The program product of claim 17, the playing of the portion of the aural map further comprising:

designating an orientation of the user to be used during the playing;

defining a focus area based on the orientation of the user;

converting the environmental text identified within the focus area into a vocalization; and incorporating the vocalization with the corresponding aural contextual indicators in the forwarding, wherein the aural contextual indicator corresponding to the environmental text identified outside the field of view is provided without the vocalization of a content of the environmental text in the forwarding.

19. The program product of claim 18, wherein the aural output device is a stereo earphone device, and wherein the aural contextual indicator indicates at least one of a lateral location of the corresponding environmental text, a size of the environmental text, a relative height of the environmental text, or a content type of the environmental text.

20. The program product of claim 17, wherein the at least one environmental location specified by the user includes a beginning location and an ending location, the automatically delivering further comprising:

retrieving a plurality of aural maps corresponding to a plurality of locations along a route between the starting location and the ending location; and providing each of the plurality of aural maps to the aural output device in a sequence from the starting location to the ending location.

\* \* \* \* \*